(12) United States Patent
Sarra et al.

(10) Patent No.: US 8,782,740 B1
(45) Date of Patent: Jul. 15, 2014

(54) SYSTEMS AND METHODS FOR DETECTION OF UNAUTHORIZED OR UNSECURED ACCESS POINTS

(75) Inventors: Anthony Nicholas Sarra, Riverton, UT (US); Plinio Pimentel, Highland, UT (US)

(73) Assignee: Crimson Corporation, Dover, DE (US)

( * ) Notice: Subject to any disclaimer, the term of this patent is extended or adjusted under 35 U.S.C. 154(b) by 706 days.

(21) Appl. No.: 12/361,354

(22) Filed: Jan. 28, 2009

(51) Int. Cl.
*G06F 21/00* (2013.01)

(52) U.S. Cl.
USPC ............... 726/3; 380/250; 455/410; 455/411; 455/434

(58) Field of Classification Search
USPC ............... 726/3; 380/250; 455/410, 411, 434
See application file for complete search history.

(56) References Cited

U.S. PATENT DOCUMENTS

| | | | |
|---|---|---|---|
| 7,154,874 B2 * | 12/2006 | Bhagwat et al. | 370/338 |
| 7,346,338 B1 * | 3/2008 | Calhoun et al. | 455/411 |
| 7,380,268 B2 * | 5/2008 | Challener et al. | 726/2 |
| 7,555,783 B2 * | 6/2009 | Enright | 726/27 |
| 7,885,639 B1 * | 2/2011 | Satish et al. | 455/410 |
| 7,934,005 B2 * | 4/2011 | Fascenda | 709/229 |
| 7,965,842 B2 * | 6/2011 | Whelan et al. | 380/247 |
| 8,005,217 B2 * | 8/2011 | Pham et al. | 380/247 |
| 8,103,003 B2 * | 1/2012 | Hiroki | 380/270 |
| 8,266,681 B2 * | 9/2012 | Deshpande et al. | 726/5 |
| 2007/0113082 A1 * | 5/2007 | Lai et al. | 713/168 |
| 2010/0265845 A1 * | 10/2010 | Lampen | 370/254 |

OTHER PUBLICATIONS

"Accurate Wireless Intrusion Protection & Monitoring," http://www.airdefense.net/products/enterprise.php, Jun. 2, 2009.
"Motorola AirDefense Enterprise," http://www.airdefense.net/products/features/security.php#comprehensive, Jun. 2, 2009.

* cited by examiner

*Primary Examiner* — Amare F Tabor
(74) *Attorney, Agent, or Firm* — Austin Rapp & Hardman

(57) ABSTRACT

A method for detecting unauthorized or unsecured access points is disclosed. At least one node of a computer network having a wireless network interface is identified. At least one of the identified nodes is requested to scan for detectable wireless access points. A listing of identified wireless access points is utilizing information gathered through at least one of the scans. An inventory of authorized wireless access points is formulated. The listing is compared to the inventory to identify unauthorized wireless access points. Also, security information may be gathered and analyzed for identified wireless access points.

7 Claims, 8 Drawing Sheets

SYSTEMS AND METHODS FOR DETECTION OF UNAUTHORIZED OR UNSECURED ACCESS POINTS

TECHNICAL FIELD

The present invention relates generally to computers and computer-related technology. More specifically, the present invention relates to systems and methods for detection of unauthorized or unsecured access points.

BACKGROUND

Computer and communication technologies continue to advance at a rapid pace. Indeed, computer and communication technologies are involved in many aspects of a person's day. Computers include everything from hand-held computing devices to large multi-processor computer systems.

Computers are used in almost all aspects of business, industry, and academic endeavors. More and more homes are using computers as well. The pervasiveness of computers has been accelerated by the increased use of computer networks, including the Internet. Most companies have one or more computer networks and also make extensive use of the Internet. The productivity of employees often requires human and computer interaction. Improvements in computers and software have been a force for bringing about great increases in business and industrial productivity.

Maintaining and supporting computer systems is important to anyone who relies on computers. Whether a computer or computing device is in a home or at a business, at least some maintenance and/or support is often needed. For example, sometimes there are problems with computer hardware. In addition, computer hardware is often upgraded and replaced with new components. Similarly computer software is also frequently upgraded or replaced. New computer hardware and software are continually being integrated into systems across the world.

Installing new computer hardware and/or software, or fixing problems with existing systems, may cause down-time during which the business or individual operates at a diminished level. Most individuals and businesses try to minimize computer problems so as to avoid down-time. Managing the constant barrage of software upgrades and updates can be time consuming and overwhelming to both computer users and network administrators.

As corporate performance and end-user productivity have become increasingly dependent on computers, computer support personnel are continuously under pressure to accomplish more with existing or reduced staff head counts. They are also under pressure to perform tasks as efficiently as possible.

As shown from the above discussion, there is a need for systems and methods that will improve the ability to manage and support computer systems. Improved systems and methods may enable a person performing computer support to work more efficiently and accomplish more in less time. Benefits may be realized by providing increased functionality to assist in computer maintenance and support.

BRIEF DESCRIPTION OF THE DRAWINGS

Exemplary embodiments of the invention will become more fully apparent from the following description and appended claims, taken in conjunction with the accompanying drawings. Understanding that these drawings depict only exemplary embodiments and are, therefore, not to be considered limiting of the invention's scope, the exemplary embodiments of the invention will be described with additional specificity and detail through use of the accompanying drawings in which:

DETAILED DESCRIPTION

Figure 1:
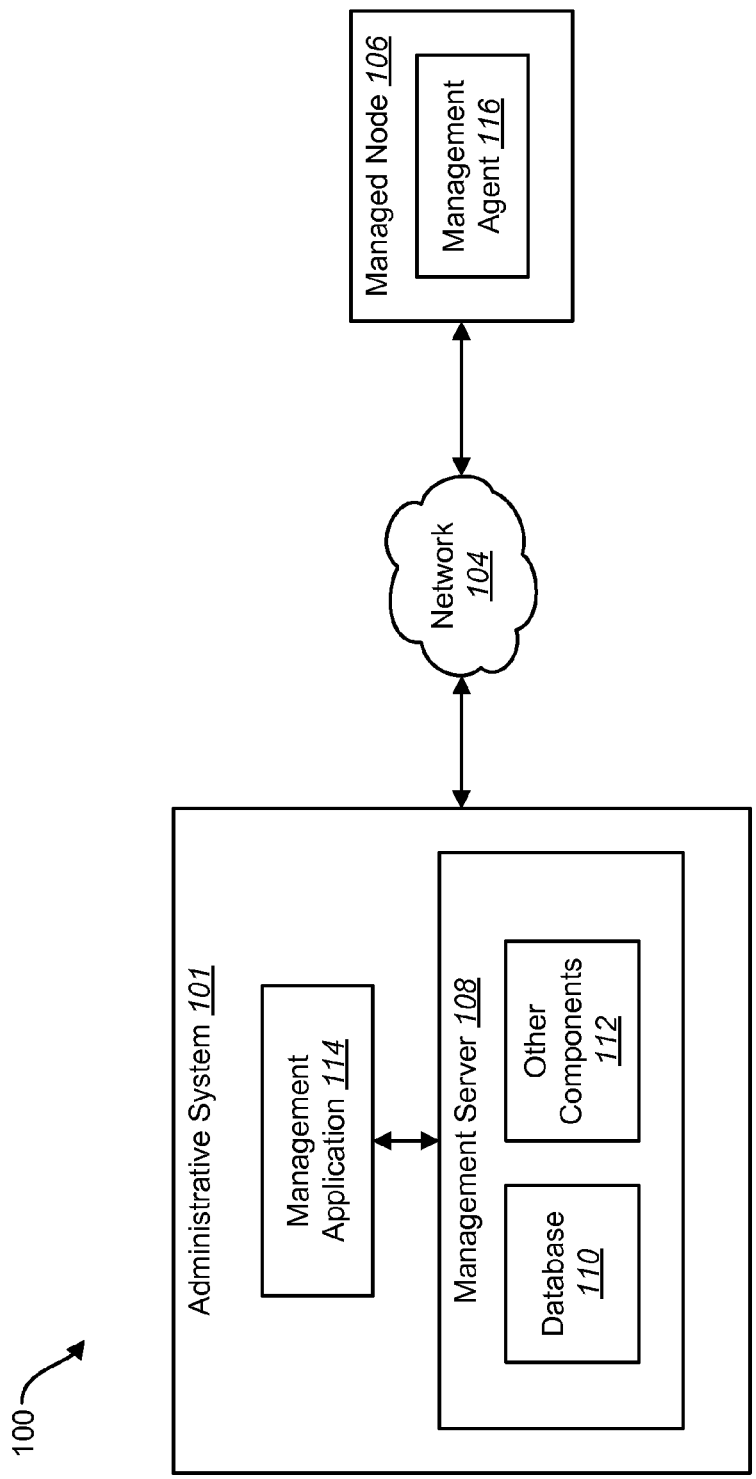
FIG. 1 illustrates an exemplary system in which some embodiments may be practiced, the system including an administrative system and a managed node.

A computer-implemented method for detecting unauthorized access points is disclosed. At least one node of a computer network is identified as having a wireless network interface. At least one of the identified nodes is requested to scan for detectable wireless access points. A listing of the identified wireless access points is created. Information obtained through at least one of the scans is utilized. An inventory of authorized wireless access points is formulated. The listing is compared to the inventory to identify unauthorized wireless access points.

Security measures may be taken with respect to the identified unauthorized wireless access points. Taking security measures may include sending an alert. Security information may be gathered for at least one of the identified wireless access points. The security information may be analyzed. Security measures may be taken based on the analysis of the security information. The security information may include an SSID for at least one of the identified wireless access points. The security information may include encryption status for at least one of the identified wireless access points.

A computer system for detecting unauthorized access points is disclosed. The computer system includes a processor and memory in electronic communication with the processor. Executable instructions are stored in the memory. At least one node of a computer network is identified as having a wireless network interface. At least one of the identified nodes is requested to scan for detectable wireless access points. A listing of the identified wireless access points is created. Information obtained through at least one of the scans is utilized. An inventory of authorized wireless access points is formulated. The listing is compared to the inventory to identify unauthorized wireless access points.

A computer-readable medium comprising instructions executable to detect unauthorized access points is disclosed. At least one node of a computer network is identified as having a wireless network interface. At least one of the identified nodes is requested to scan for detectable wireless access points. A listing of the identified wireless access points is created utilizing information obtained through at least one of the scans. An inventory of authorized wireless access points is formulated. The listing is compared to the inventory to identify unauthorized wireless access points.

Various embodiments of the invention are now described with reference to the Figures, where like reference numbers indicate identical or functionally similar elements. The embodiments of the present invention, as generally described and illustrated in the Figures herein, could be arranged and designed in a wide variety of different configurations. Thus, the following more detailed description of several exemplary embodiments of the present invention, as represented in the Figures, is not intended to limit the scope of the invention, as claimed, but is merely representative of the embodiments of the invention.

The word "exemplary" is used exclusively herein to mean "serving as an example, instance, or illustration." Any embodiment described herein as "exemplary" is not necessarily to be construed as preferred or advantageous over other embodiments. While the various aspects of the embodiments are presented in drawings, the drawings are not necessarily drawn to scale unless specifically indicated.

Many features of the embodiments disclosed herein may be implemented as computer software, electronic hardware, or combinations of both. To clearly illustrate this interchangeability of hardware and software, various components will be described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Where the described functionality is implemented as computer software, such software may include any type of computer instruction or computer-executable code located within a memory device and/or transmitted as electronic signals over a system bus or network. Software that implements the functionality associated with components described herein may comprise a single instruction, or many instructions, and may be distributed over several different code segments, among different programs, and across several memory devices.

Wireless security products currently on the market typically utilize dedicated appliances located throughout the environment that listen to radio traffic and report to a central console over the wired network. This approach requires an investment in proprietary hardware and installation. The solution falls short if the sensing appliances are not deployed to all 'corners' of the corporate environment thus leaving 'holes' in the coverage area where rogue access points could exist.

The present systems and methods may use almost any computer with a wireless network interface card (NIC) to act as a remote probe looking for all active access points. The collection of wireless enabled machines becomes a virtual antenna that may reach every corner of the enterprise. Thus, many configurations of the current systems and methods enable detection within the radio reception range of every wireless corporate computer, rather than having the detection limited to the range of a sensing appliance that may or may not overlap with that of the corporation's computers.

FIG. 1 illustrates an exemplary system 100 in which some embodiments may be practiced. An administrative computer system 101 is connected to a computer network 104, such as a corporate local area network (LAN). The administrative system 101 is used to manage other computer systems that are also connected to the computer network 104. These other computer systems will be referred to herein as "managed nodes." For simplicity, only a single managed node 106 is shown in the system 100 of FIG. 1. Of course, the systems in which embodiments disclosed herein are practiced may include many additional managed nodes.

The administrative system 101 includes a management server 108. The management server 108 includes a database 110 of information. The management server 108 also includes various other components 112 that are configured to perform tasks such as scheduling, handling alerts, and so forth. An example of a management server 108 that may be used with embodiments disclosed herein is the core server for the LANDesk® Management Suite.

The administrative system 101 also includes a management application 114. The management application 114 may be used to perform various tasks related to the management of the computer network 104, such as remote control, software distribution, software license monitoring, operating system imaging and migration, IT asset management, problem resolution, and so forth. As part of performing these tasks, the management application 114 may connect to the management server 108 and query the management server 108 for information. An example of a management application 114 that may be used is the console application for the LANDesk® Management Suite. Although a management server 108 is shown in the embodiment depicted in FIG. 1, not all embodiments require a management server 108.

To enable a user of the administrative system 101 to perform management tasks via the management application 114, the managed node 106 includes a management agent 116. The management agent 116 performs management-related tasks in response to requests from the management application 114 or may perform management-related tasks independent of the management application 114. An example of a management agent 116 that may be used is the LANDesk® Management Agent.

Figure 2:
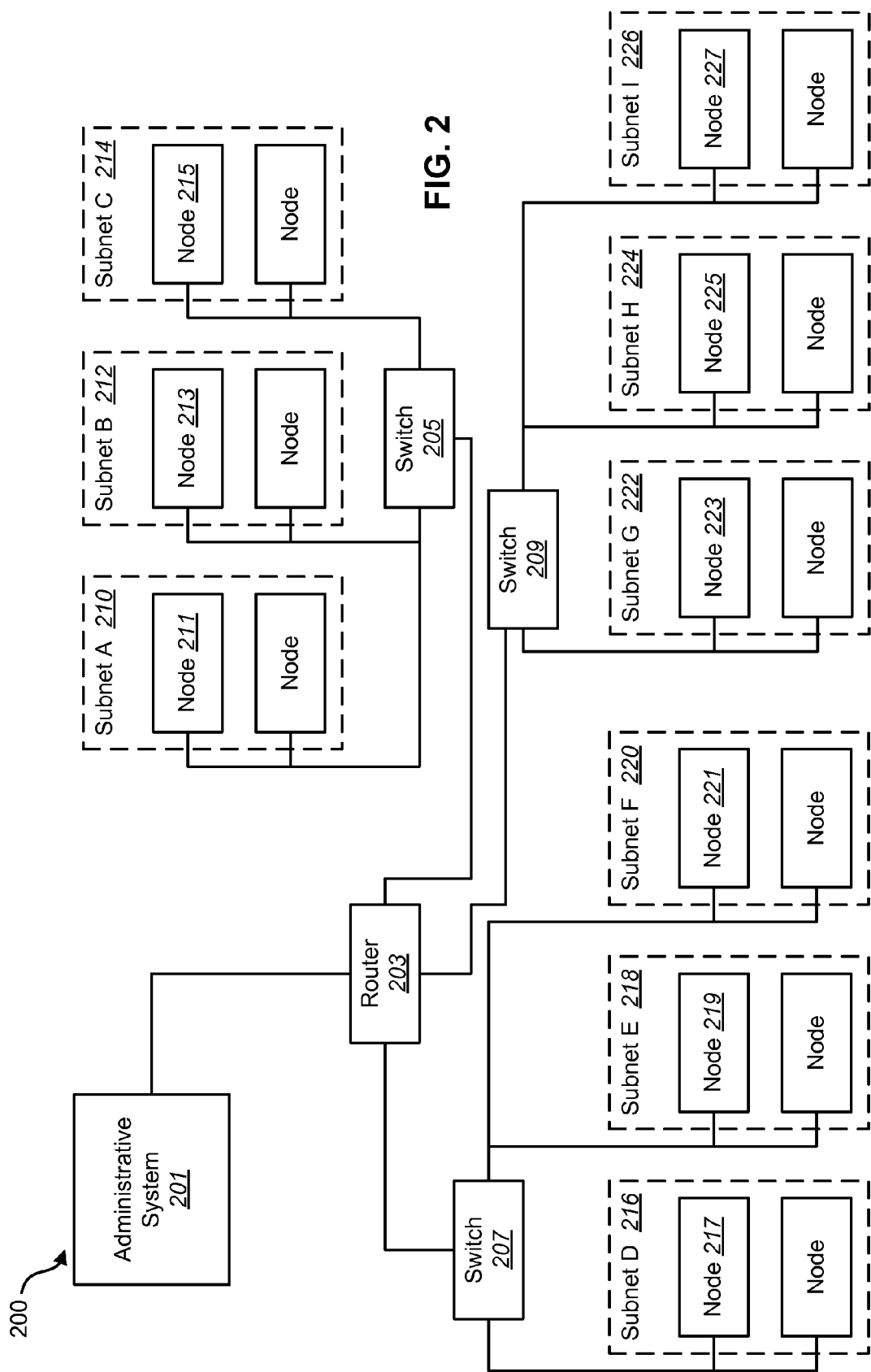
FIG. 2 illustrates a computer network on which the present systems and methods may be implemented.

FIG. 2 illustrates a computer network 200 on which the present systems and methods may be implemented. In FIG. 2, an administrative system 201 connects to a router 203. The router 203 is connected to three switches: a first switch 205, a second switch 207 and a third switch 209. Each switch 205, 207, 209 connects to three subnets. The first switch 205 connects to three subnets: subnet A 210, subnet B 212, and subnet C 214. The second switch 207 connects to three subnets: subnet D 216, subnet E 218, and subnet F 220. The third switch 209 connects to three subnets: subnet G 222, subnet H 224, and subnet I 226. Each subnet includes one or more managed nodes. The managed nodes 211, 213, 215, 217, 219, 221, 223, 225, 227 represent computer systems or devices on the computer network. In some embodiments, the subnets 210, 212, 214, 216, 218, 220, 222, 224, 226 may comprise a multicast alias domain. A multicast alias domain includes all of the nodes that can see each other's multicast traffic without crossing a router 203.

Figure 3:
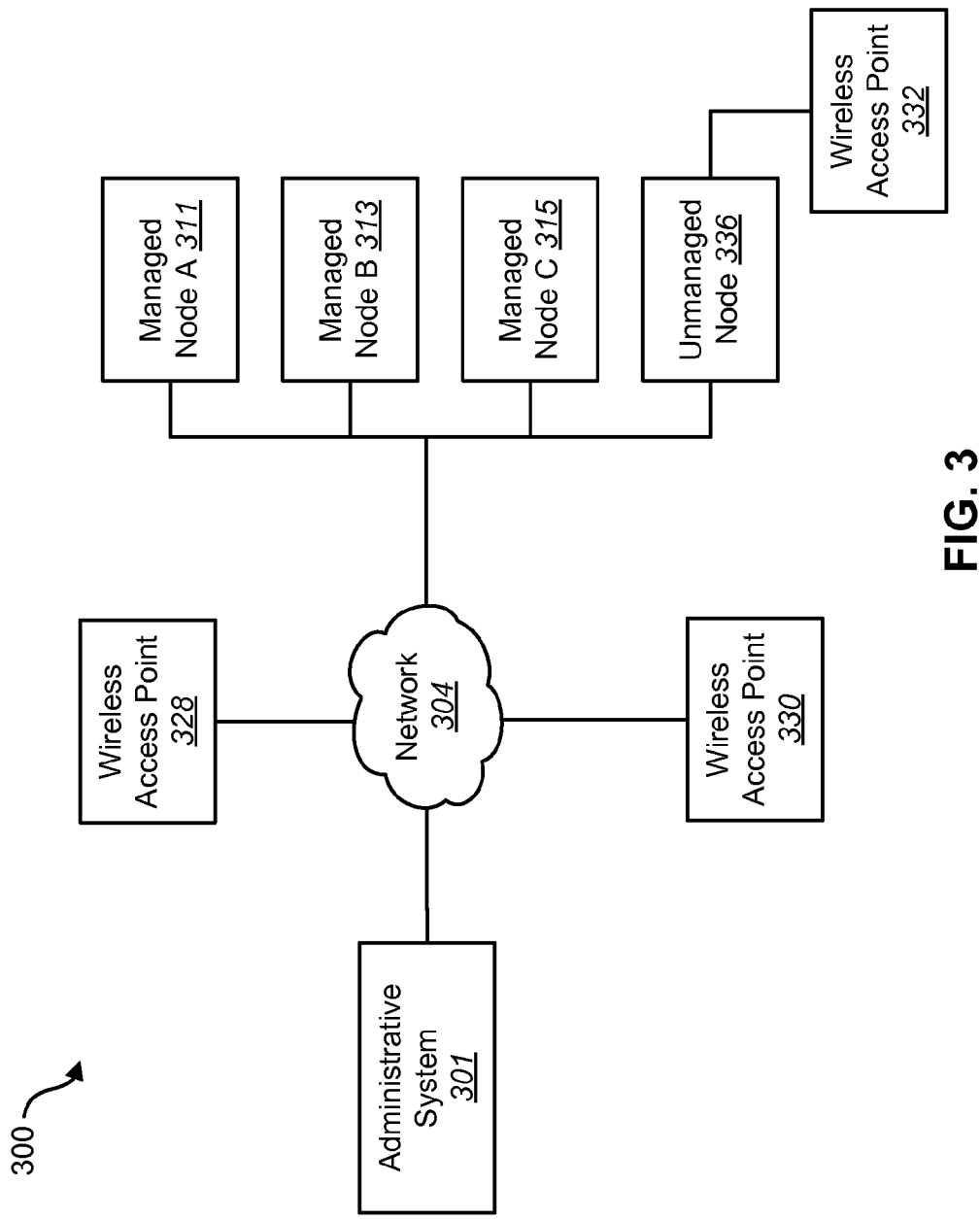
FIG. 3 is a block diagram illustrating one embodiment of a system including wireless access points in which embodiments disclosed herein may be practiced.

FIG. 3 is a block diagram illustrating one embodiment of a system 300 in which unauthorized or unsecured wireless access points 328, 330, 332 may be detected. The system 300 may include one or more administrative systems 301, wireless access points 328, 330, 332, managed nodes 311, 313, 315, and even unmanaged nodes 336. The system 300 may also include a network 304 that enables electronic communication throughout the system 300. The administrative system 301 and managed nodes 311, 313, 315 have also been discussed in connection with FIGS. 1 and 2.

An unmanaged node 336 is a node that is not controlled, monitored, or updated utilizing management software, such as the management agent 116 and/or the management application 114, which are illustrated in FIG. 1. An unmanaged node 336 may be "unmanaged" through an attempt to circumvent the security of the network 304 (e.g., by removal or disabling or uninstalling a management agent 116 by an end-user or a viral attack) or by an inadvertent error (e.g., the failure to properly install a management agent 116).

As indicated above, the system 300 may also include one or more wireless access points 328, 330, 332. The wireless access points 328, 330, 332 enable a computer system, or any other type of computing device (e.g., a wireless printer), to wirelessly communicate with network components and utilize available network resources, such as Internet access, printers, or files stored on the network 304 through a wireless network interface card (NIC). A wireless access point 328, 330, 332 may use one or more of various different protocols for communication, such as 802.11b, 802.11g, and 802.11n or any combination of these wireless communication protocols.

Figure 4:
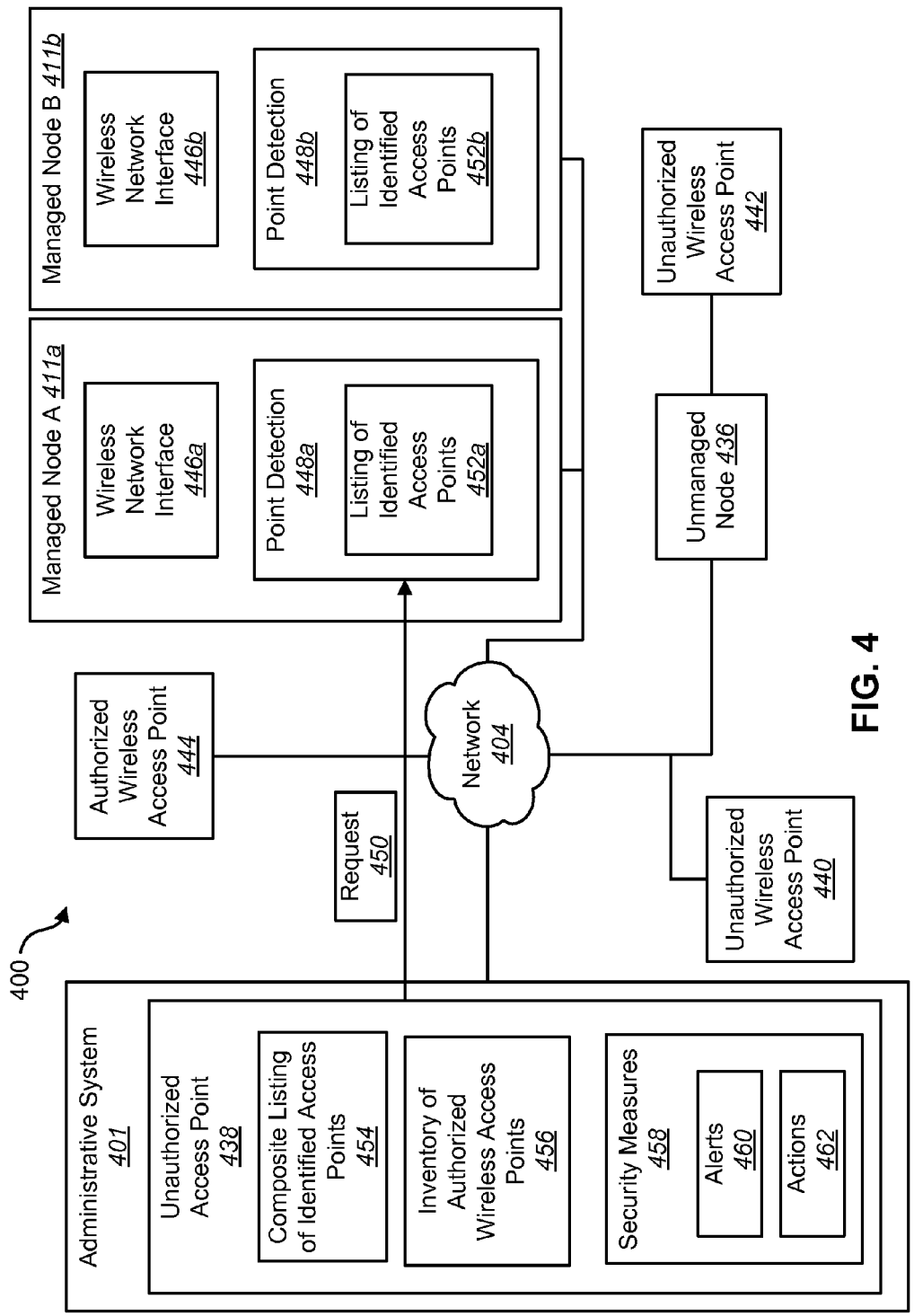
FIG. 4 is a block diagram illustrating one embodiment of a system for detection of unauthorized wireless access points.

FIG. 4 illustrates one embodiment of a system 400 for detecting unauthorized or unsecured wireless access points 440, 442. The system 400 may include one or more administrative systems 401, managed nodes 411a-b, and may also include one or more unmanaged nodes 436. The system 400 may also include one or more authorized wireless access points 444 and/or unauthorized wireless access points 440, 442.

One or more of the nodes 411a-b may include a wireless network interface 446a-b. The wireless network interface 446a-b may be embodied in a number of different ways, such as a Personal Computer Memory Card Industry Association ("PCMCIA") card, an ExpressCard for a laptop computer or other type of mobile computing device or a Peripheral Component Interconnect (PCI) card, a Mini PCI card, or a Universal Serial Bus (USB) network adaptor. The wireless network interface 446a-b could also be integrated with a stationary or mobile computer, a motherboard, or could be included an external device for connection to a node 411a-b, 436. Regardless of the configuration of the wireless network interface 446a-b, such an interface 446a-b enables detection of wireless access points 440, 442, 444 that are broadcasting a signal for connection to a network 404.

One or more of the managed nodes 411a-b may also include a point detection component 448a-b. The point detection component 448a-b, utilizing the wireless network interface 446a-b, scans for and identifies wireless access points 440, 442, 444 that are broadcasting a signal. The point detection component 448a-b may initiate scanning in response to a request 450 from the administrative system 401. A request 450 to commence scanning could be made through settings (e.g., on a periodic interval or when certain conditions are detected) in the point detection component 448a-b input by a manufacturer, user, or administrator. Utilizing this information, the point detection component 448a-b compiles a listing 452a-b of identified access points 440, 442, 444.

This listing 452a-b may be transmitted to an unauthorized access point component 438 of the administrative system 401. Utilizing the listing 452a-b of identified access points 440, 442, 444 gathered from various nodes 411a-b, a composite listing 454 of identified access points 440, 442, 444 is created. The composite listing 454 may include listings 452a-b from a single node 411a-b or many different nodes 411a-b.

The unauthorized access point component 438 may also compile an inventory 456 of authorized wireless access points 444. The inventory 456 may be created in a number of different ways. For example, the authorized access points 444 could be identified in response to an administrator inputting a Media Access Control (MAC) address, or other identifier for authorized access points 444. Alternatively, as another example, an administrator could simply create the inventory 456 by reviewing the composite listing 454 and identifying those access points 444 which are authorized. In another embodiment, set service identifiers (SSIDs) for authorized access points 444 are input into the system 400 and could comprise the inventory 456 of authorized access points 444 or could be utilized to formulate the inventory 456.

The unauthorized access point component 438 then compares the composite listing 454 to the inventory 456. Based on this comparison, the unauthorized access point component 438 identifies unauthorized access points 440, 442.

With specific reference to the embodiment illustrated in FIG. 4, the listing of identified access points 440, 442, 444 would include a first authorized access wireless point 444 and a first and a second unauthorized wireless access point 440, 442. This information would be conveyed from one or more of the first and second managed nodes 411a-b to the administrative system 401. Thus, the composite listing 454 of identified access points 440, 442, 444 would include the first authorized wireless access point 444, and the first and second unauthorized wireless access points 440, 442. In such an embodiment, the inventory 456 of authorized access points 444 would only include the first authorized access point 444. Thus, the unauthorized access point component 438 would compare the composite listing 454 to the inventory 456 and identify the first and second unauthorized access points 440, 442 as not being authorized access points 444.

After unauthorized wireless access points 440, 442 have been identified, security measures 458 may be taken. The security measures 458 may be embodied in a number of different ways. For example, the security measures 458 could include alerts 460 (such as an e-mail or system alert). These alerts 460 could be provided to an administrator or other users, such as users who may be identified as utilizing the unauthorized wireless access points 440, 442. To resolve issues related to the unauthorized access points 440, 442, in the alternative or in addition to alerts 460, actions 462 may be taken, such as blocking requests that pass through unauthorized access points 440, 442.

One advantage of the disclosed system 400 is that pre-existing wireless network interfaces 446a-b (e.g., a NIC card) and managed nodes 411a-b may be utilized, mitigating implementation costs. Proprietary hardware for detecting unauthorized nodes, which can be extremely expensive, does not need to be purchased or utilized to implement the system 400. Utilizing wireless network interfaces 446a-b already within the network, a broad geographic span of coverage could be achieved, rather than attempting to identify unauthorized wireless access points 440, 442 from a central or a single location. This span of coverage could become even broader utilizing the disclosed systems 400 and methods if, for example, a managed node 411a-b comprises a mobile computing device (such as a laptop) with a wireless network interface 446a-b that can be moved to different geographical locations within the span of the network 404.

Figure 5:
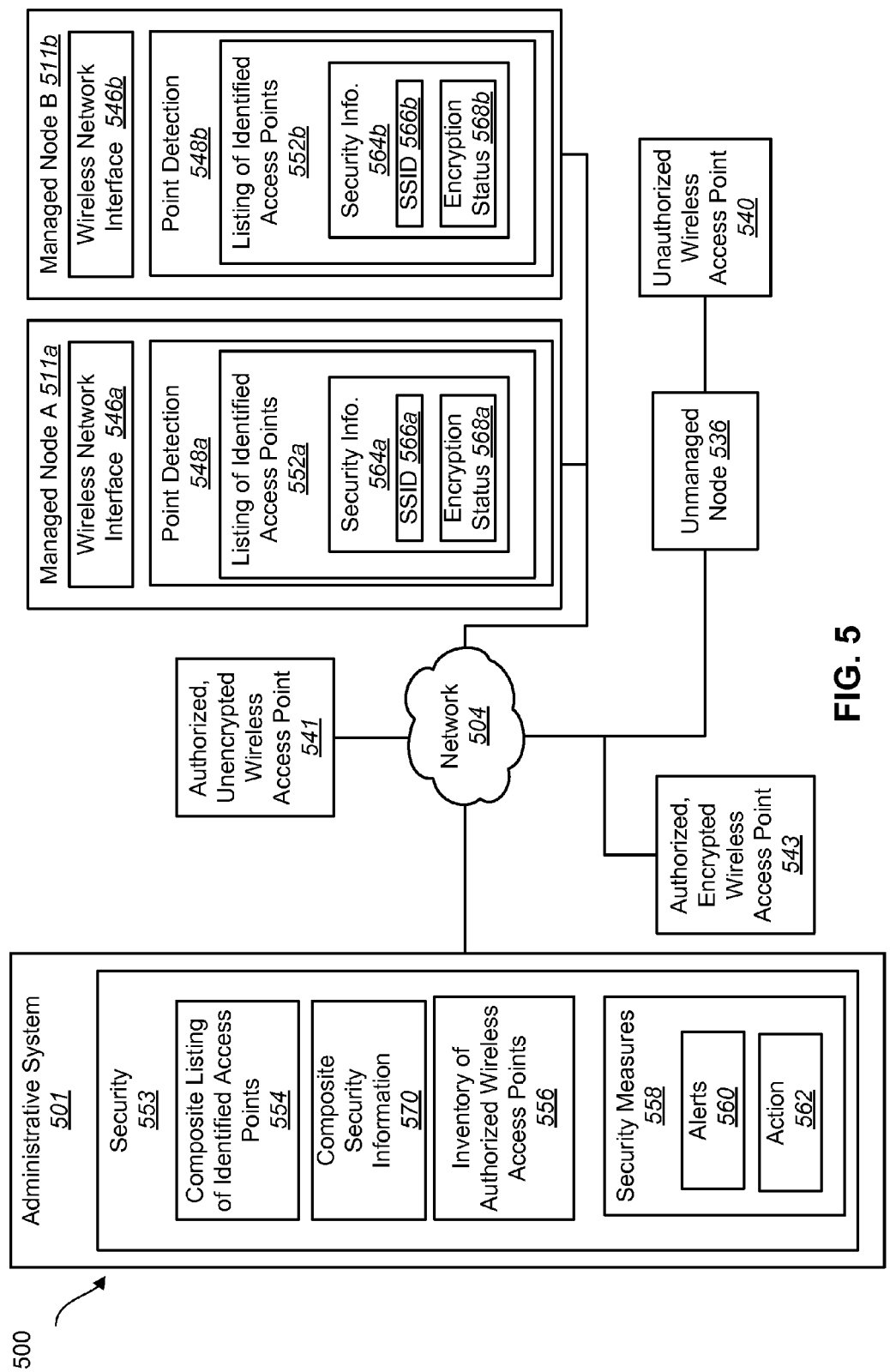
FIG. 5 is a block diagram illustrating an embodiment of a system for detecting unauthorized or unsecured wireless access points.

FIG. 5 is a block diagram illustrating another embodiment of a system 500 for detection of unauthorized or unsecured access points 540.

The system 500 includes one or more administrative systems 501, wireless access points 540, 541, 543, managed nodes 511a-b, or unmanaged nodes 536. In the embodiment disclosed in FIG. 5, managed nodes 511a-b may also include a wireless network interface 546a-b and a point detection component 548a-b. The point detection component 548a-b may compile and store a listing 552a-b of identified access points 540, 541, 543. This listing 552a-b may comprise security information 564a-b related to the identified wireless access points 540, 541, 543. The security information 564*a-b* could include the SSID 566*a-b*, SSID broadcast status, encryption status 568*a-b*, encryption type, MAC address, MAC address filter status, and other information that may be related to the security of the identified wireless access points 540, 541, 543. The SSID 566*a-b* comprises an identifier that may be broadcast by a wireless access point 540, 541, 543. The SSID broadcast status indicates whether the SSID 566*a-b* is being broadcast or hidden. Encryption status 568*a-b* indicates whether network communications through a pertinent wireless access point 540, 541, 543 are encrypted. The encryption type indicates what type of wireless encryption is being utilized, if any. Different types of encryption include, by way of example only, wired equivalent privacy (WEP)-64, WEP-128, WEP-256, 802.1x, Wi-Fi Protected Access (WPA), or WPA-PSK. The MAC address could be the MAC address of the pertinent wireless access points 540, 541, 543 or the MAC address of computer systems utilizing a wireless access point 540, 541, 543. The MAC address filter status indicates whether a MAC address filtering feature is enabled. The MAC address filtering feature, if enabled, allows only computing devices of specifically identified MAC addresses to use the specified wireless access point 540, 541, 543.

The administrative system 501 may include a security component 553. In certain embodiments, the security component 553 may include one or more of the following components: a composite listing of identified access points 554, composite security information 570, an inventory of authorized wireless access points 556, and security measures 558.

The listing 552*a-b* of identified access points 540, 541, 543 together with the accompanying security information 564*a-b* may be transmitted to the administrative system 501. Utilizing this information 564*a-b* from one or more of the managed nodes 511*a-b*, a composite listing 554 of identified access points 540, 541, 543 and composite security information 570 may be created. As with the embodiment of FIG. 4, the composite listing 554 may be compared to an inventory 556 of authorized access points 541, 543 to identify unauthorized access points 540. For example, SSIDs 564*a-b* from the composite security information 570 could be used to identify whether a pertinent wireless access point 540, 541, 543 is authorized by comparing the obtained SSID 564*a-b* to a list of authorized SSIDs. Composite security information 570 may also be utilized to identify security vulnerabilities of wireless access points 540, 541, 543, such as whether encryption 568*a-b* is being utilized, whether the SSID 566*a-b* is being broadcast, or whether the MAC address filtering is being employed.

Following identification of unauthorized access points 540 or security flaws, security measures 558 may be taken. The security measures 558 may include alerts 560 or actions 562. The actions 562 might encompass setting a wireless access point 540, 541, 543 to utilize encryption algorithm or hiding its SSID 556*a-b*, or enabling a MAC address filter.

Figure 6:
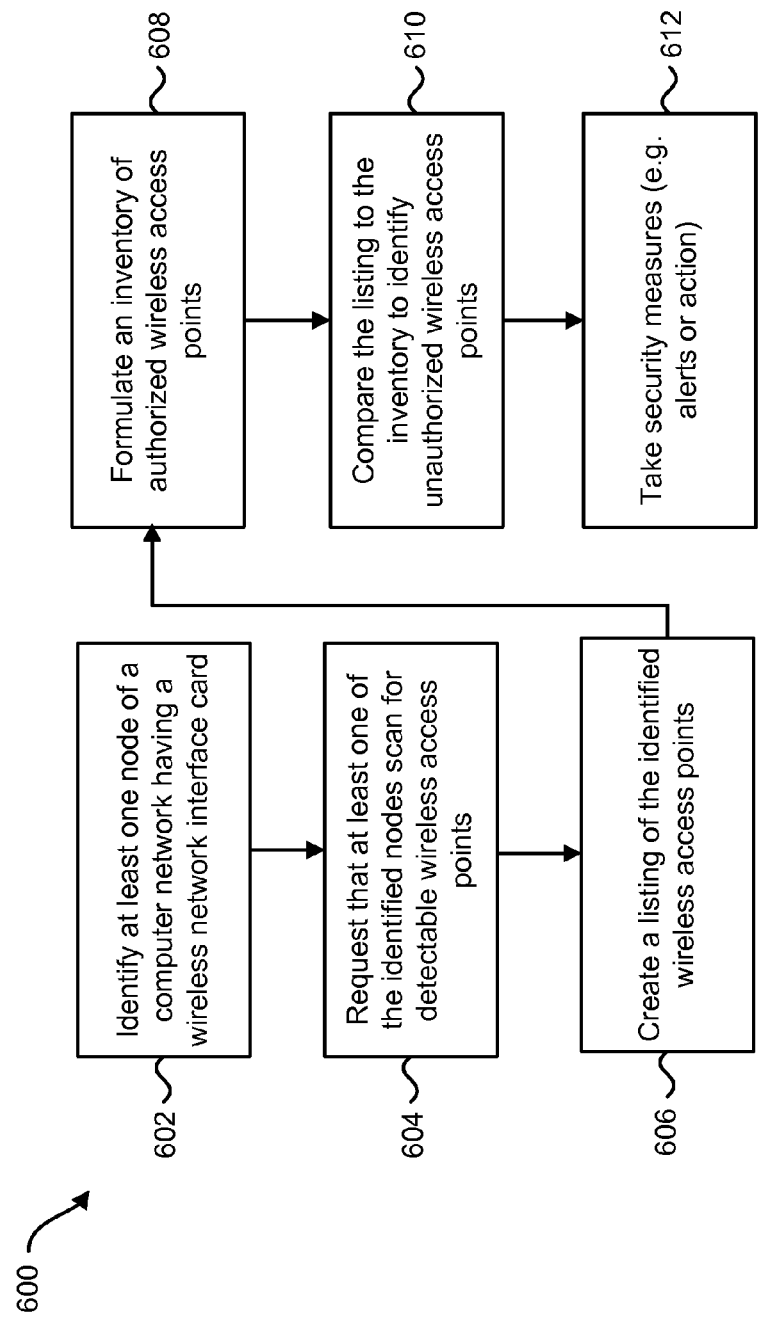
FIG. 6 is a flowchart illustrating one embodiment of a method for detecting unauthorized wireless access points.

FIG. 6 illustrates one embodiment of a method 600 for detecting unauthorized or unsecured wireless access points 540. At least one node of a computer network 504 having a wireless network interface 546*a-b* is identified 602. Identification 602 of nodes 511*a-b* having a wireless network interface 546*a-b* may be achieved by querying an inventory system (e.g., LANDesk® Inventory Management Software) listing assets within a network 504. Such an identification 602 may also occur in response to user input, such as input from an administrator.

At least one of the identified nodes 511*a-b* is requested 604 to scan for detectable wireless access points 540, 541, 543. Requests 604 may take a number of different forms, such as a default setting on software (e.g., a point detection component 548*a-b*). A request 604 could be transmitted via a network 504 or could be made in response to user input at a managed node 511*a-b*.

A listing 554 of the identified wireless access points 540, 541, 543 is created 606 utilizing information obtained through at least one of the scans. The created listing may include a listing 554 at a single node 501, 511*a-b*, such as an administrative system 501 or a managed node 511*a-b*, or a composite listing 554 gathered from a number of different nodes 511*a-b*, 536. An inventory 556 of authorized wireless access points 541, 543 is formulated 608. The inventory 556 may be created in response to user input specifying authorized wireless access points 541, 543 or could be derived from a compilation of network assets or comprise a part of such a compilation. The listing 554 is compared 610 to the inventory 556 to identify unauthorized wireless access points 540.

Thereafter, security measures 558 may be taken 612. The security measures 558 could include alerts 560 or actions 562 to prevent use of unauthorized wireless access points 540 or to mitigate or limit potential damage resulting from traffic through these access points 540, 541, 543.

Figure 7:
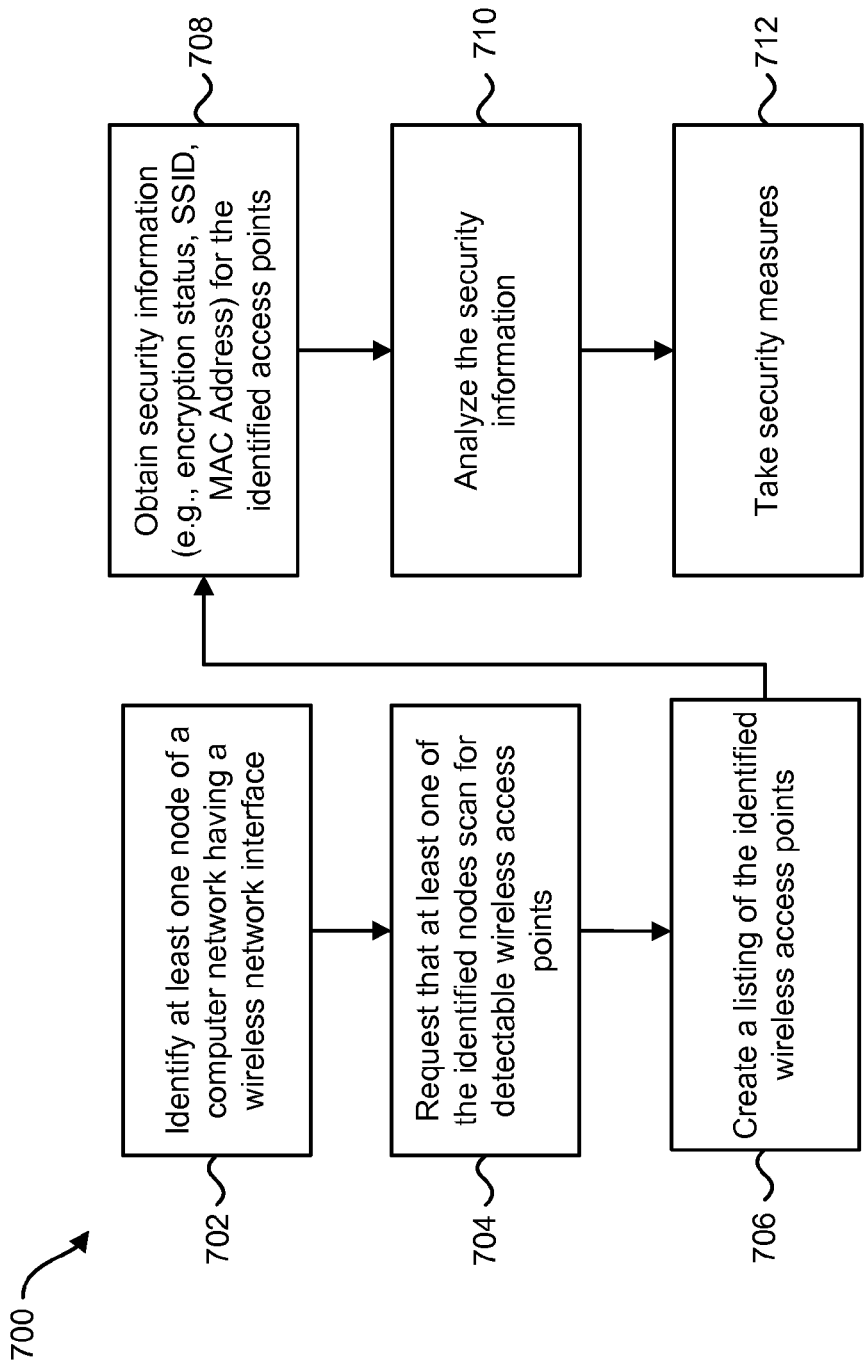
FIG. 7 is a flowchart illustrating an embodiment of a method for detecting unauthorized or unsecured wireless access points.

FIG. 7 is a flow diagram illustrating one embodiment of a method 700 for detection of unauthorized or unsecured access points 540, 541, 543. At least one node 511*a-b* of a computer network 504 having a wireless network interface 546*a-b* is identified 702. The identified nodes could include a managed node 511*a-b*, an administrative system 501, or any other type of computing device. At least one of the identified nodes 511*a-b*, 501 is requested 704 to scan for detectable wireless access points 540, 541, 543 utilizing a pertinent wireless network interface 546*a-b*. Such a request 704 could be embodied, for example, as a network request 450 or as a default setting for software running on a managed node 511*a-b* (e.g., a point detection component 548*a-b*).

A list 554 of identified wireless access points 540, 541, 543 is created 706 utilizing information obtained through at least one of the scans. Security information 564*a-b* for each of the identified access points 540, 541, 543 is obtained 708. The security information 564*a-b* could include encryption status 568*a-b*, type of encryption utilized (if any), an SSID 566*a-b*, a MAC address, MAC address filter status, whether the SSID 566*a-b* is being broadcast, etc.

The security information 564*a-b* is then analyzed 710. Analysis 710 of the security information 564*a-b* could include, for example, determining whether the SSID 566*a-b* of identified access points 540, 541, 543 obtained matches an SSID 566*a-b* for authorized access points 541, 543, determining whether the identified access points 540, 541, 543 all employ encryption of a particular type or the encryption status 568*a-b* of these access points 540, 541, 543, or whether MAC address filtering is being employed and so forth. Based on this analysis 710, security measures 558 are taken 712. As indicated above, the security measures 558 could include alerts 560 and/or actions 562. The actions 562 could include blocking traffic coming through an unauthorized access point 540, preventing managed nodes 511*a-b* from utilizing an authorized access point 541, 543, altering the settings for an unsecured access point 540 to impose specified security measures 558, etc.

Figure 8:
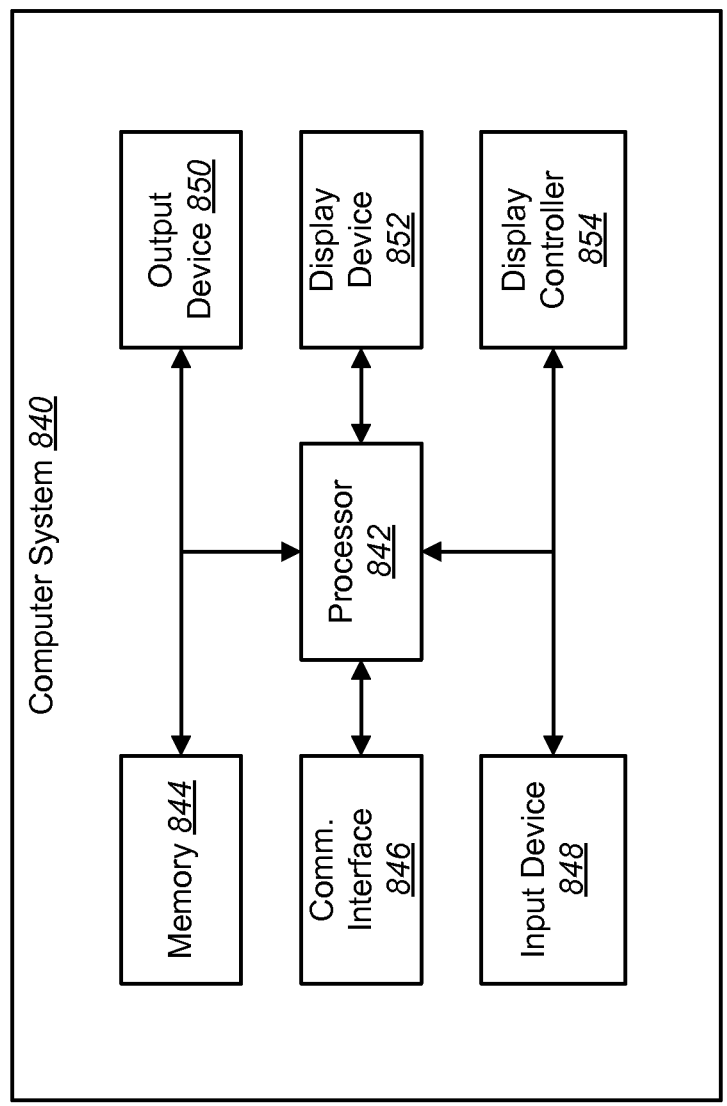
FIG. 8 is a block diagram illustrating the major hardware components typically utilized in a computer system.

FIG. 8 is a block diagram illustrating the major hardware components typically utilized in a computer system 840, such as a node 511*a-b*, 536 or an administrative system 501. The illustrated components may be located within the same physical structure or in separate housings or structures.

The computer system 840 includes a processor 842 and memory 844. The processor 842 controls the operation of the computer system 840 and may be embodied as a microprocessor, a microcontroller, a digital signal processor (DSP) or other device known in the art. The processor 842 typically performs logical and arithmetic operations based on program instructions stored within the memory 844.

As used herein, the term memory 844 is broadly defined as any electronic component capable of storing electronic information, and may be embodied as read-only memory (ROM), random access memory (RAM), magnetic disk storage media, optical storage media, flash memory devices in RAM, on-board memory included with the processor 842, EPROM memory, EEPROM memory, registers, etc. The memory 844 typically stores program instructions and other types of data. The program instructions may be executed by the processor 842 to implement some or all of the methods disclosed herein.

The computer system 840 typically also includes one or more communication interfaces 846 for communicating with other electronic devices. The communication interfaces 846 may be based on wired communication technology, wireless communication technology, or both. Examples of different types of communication interfaces 846 include a serial port, a parallel port, a Universal Serial Bus (USB), an Ethernet adapter, an IEEE bus interface, a small computer system interface (SCSI) bus interface, an infrared (IR) communication port, a Bluetooth wireless communication adapter, and so forth.

The computer system 840 typically also includes one or more input devices 848 and one or more output devices 850. Examples of different kinds of input devices 848 include a keyboard, mouse, microphone, remote control device, button, joystick, trackball, touchpad, lightpen, etc. Examples of different kinds of output devices 850 include a speaker, printer, etc. One specific type of output device that is typically included in a computer system 840 is a display device 852. Display devices 852 used with embodiments disclosed herein may utilize any suitable image projection technology, such as a cathode ray tube (CRT), liquid crystal display (LCD), light-emitting diode (LED), gas plasma, electroluminescence, or the like. A display controller 854 may also be provided, for converting data stored in the memory 844 into text, graphics, and/or moving images (as appropriate) shown on the display device 852.

Of course, FIG. 8 illustrates only one possible configuration of a computer system 840. Various other architectures and components may be utilized.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array signal (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The methods disclosed herein comprise one or more steps or actions for achieving the described method. The method steps and/or actions may be interchanged with one another without departing from the scope of the present invention. In other words, unless a specific order of steps or actions is required for proper operation of the embodiment, the order and/or use of specific steps and/or actions may be modified without departing from the scope of the present invention.

While specific embodiments and applications of the present invention have been illustrated and described, it is to be understood that the invention is not limited to the precise configuration and components disclosed herein. Various modifications, changes, and variations which will be apparent to those skilled in the art may be made in the arrangement, operation, and details of the methods and systems of the present invention disclosed herein without departing from the spirit and scope of the invention.

What is claimed is:

1. A computer-implemented method for detecting unauthorized access points, comprising:
    identifying at least one node of a computer network having a wireless network interface, wherein the at least one node of a computer network comprises a managed computer node;
    sending, from an administrative system, a request that at least one of the identified nodes scan for detectable wireless access points, a listing of the wireless access points being created, wherein the administrative system performs tasks for management of the at least one node, and wherein the tasks comprise:
    software distribution;
    software license monitoring; and
    operating system imaging and migration;

utilizing information obtained through at least one of the scans;
formulating an inventory of authorized wireless access points based on the listing; and
comparing the listing to the inventory to identify unauthorized wireless access points;
the method further comprising:
receiving security information for at least one of the wireless access points from at least one of the identified nodes to create a composite security information, wherein the composite security information comprises:
a set service identifier (SSID) for at least one of the wireless access points;
an encryption type and an encryption status for at least one of the wireless access points; and
a medium access control (MAC) address filter status;
analyzing the composite security information; and
taking security measures with respect to the identified unauthorized wireless access points and based on the analysis of the composite security information.

2. The method of claim 1, wherein taking security measures comprises sending an alert.

3. The method of claim 1, wherein the managed computer node comprises a management agent that performs management-related tasks in response to one or more requests transmitted from an administrative system.

4. A computer system for detecting unauthorized access points, the computer system comprising:
a processor;
memory in electronic communication with the processor;
instructions stored in the memory, the instructions being executable to:
identify at least one node of a computer network having a wireless network interface, wherein the at least one node of a computer network comprises a managed computer node;
send, from an administrative system, a request that at least one of the identified nodes scan for detectable wireless access points, a listing of the wireless access points being created, wherein the administrative system performs tasks for management of the at least one node, and wherein the tasks comprise:
software distribution;
software license monitoring; and
operating system imaging and migration;
utilize information obtained through at least one of the scans;
formulate an inventory of authorized wireless access points based on the listing; and
compare the listing to the inventory to identify unauthorized wireless access points;
wherein the system is further configured to:
receive security information for at least one of the wireless access points from at least one of the identified nodes to create a composite security information, wherein the composite security information comprises:
a set service identifier (SSID) for at least one of the wireless access points;
an encryption type and an encryption status for at least one of the wireless access points; and
a medium access control (MAC) address filter status;
analyze the composite security information; and
take security measures with respect to the identified unauthorized wireless access points and based on the analysis of the composite security information.

5. The system of claim 4, wherein taking security measures comprises sending an alert.

6. A non-transitory computer-readable medium comprising instructions executable to detect unauthorized access points, the instructions being executable to:
identify at least one node of a computer network having a wireless network interface, wherein the at least one node of a computer network comprises a managed computer node;
send, from an administrative system, a request that at least one of the identified nodes scan for detectable wireless access points, a listing of the wireless access points being created utilizing information obtained through at least one of the scans, wherein the administrative system performs tasks for management of the at least one node, and wherein the tasks comprise:
software distribution;
software license monitoring; and
operating system imaging and migration;
formulate an inventory of authorized wireless access points based on the listing; and
compare the listing to the inventory to identify unauthorized wireless access points; the instructions being further executable to:
receive security information for at least one of the wireless access points from at least one of the identified nodes to create a composite security information, wherein the composite security information comprises:
a set service identifier (SSID) for at least one of the wireless access points;
an encryption type and an encryption status for at least one of the wireless access points; and
a medium access control (MAC) address filter status;
analyze the composite security information; and
take security measures with respect to the identified unauthorized wireless access points and based on the analysis of the composite security information.

7. The non-transitory computer-readable medium of claim 6, wherein taking security measures comprises sending an alert.

* * * * *